(12) United States Patent
Detjen

(10) Patent No.: US 7,721,505 B2
(45) Date of Patent: May 25, 2010

(54) LAVA AND CEMENT BUILDING BLOCK SYSTEM

(76) Inventor: Ken Detjen, 2104 Jacaranda Ct., San Bernardino, CA (US) 92404

( * ) Notice: Subject to any disclaimer, the term of this patent is extended or adjusted under 35 U.S.C. 154(b) by 0 days.

(21) Appl. No.: 11/357,593

(22) Filed: Feb. 18, 2006

(65) Prior Publication Data

US 2007/0193182 A1 Aug. 23, 2007

(51) Int. Cl.
*E04C 1/00* (2006.01)
(52) U.S. Cl. .............. 52/604; 52/596; 52/606; 52/592.4; 52/125.4; 52/425
(58) Field of Classification Search .......... 52/596, 52/599, 600, 605, 606, 607, 609, 610, 611, 52/603, 604, 592.4, 309.12, 309.17, 125.4, 52/425
See application file for complete search history.

(56) References Cited

U.S. PATENT DOCUMENTS

| | | | | |
|---|---|---|---|---|
| 3,422,588 A | * | 1/1969 | Stewart, Jr. | .......... 52/436 |
| 4,117,060 A | * | 9/1978 | Murray | .......... 264/82 |
| 4,266,921 A | * | 5/1981 | Murray | .......... 425/158 |
| 4,915,888 A | * | 4/1990 | Sato | .......... 264/71 |
| 5,024,035 A | * | 6/1991 | Hanson et al. | .......... 52/591.1 |
| 5,457,926 A | * | 10/1995 | Jensen | .......... 52/604 |
| 5,496,206 A | * | 3/1996 | Young | .......... 451/260 |
| 5,795,380 A | | 8/1998 | Billings et al. | |
| 6,149,855 A | | 11/2000 | Watson | |
| 6,226,951 B1 | * | 5/2001 | Azar | .......... 52/604 |
| 6,536,994 B2 | * | 3/2003 | Race | .......... 405/262 |
| 6,551,541 B1 | | 4/2003 | Watson | |
| 6,557,818 B2 | * | 5/2003 | Manthei | .......... 249/171 |
| 6,709,201 B2 | * | 3/2004 | Race | .......... 405/262 |
| 6,993,878 B2 | * | 2/2006 | Prokofyev | .......... 52/604 |

* cited by examiner

*Primary Examiner*—Richard E Chilcot, Jr.
*Assistant Examiner*—Chi Q Nguyen
(74) *Attorney, Agent, or Firm*—J. Curtis Edmondson

(57) ABSTRACT

The present invention discloses a novel way of building walls using lightweight lava blocks without mortar in a three step procedure, fabricating the light weight lava block, setting the block and then filling the block with a lava and cement mixture or slurry.

4 Claims, 9 Drawing Sheets

LAVA AND CEMENT BUILDING BLOCK SYSTEM

BACKGROUND

This invention relates to the field of concrete construction block and a method for creating a strong and lightweight block that can be used in the construction of walls, which is easy to assemble and manufacture. These blocks may be used in building various structures such as the walls of buildings, fences, foundations, retaining walls and virtually any wall-like structure. A primary ingredient is lava rock, which is a lightweight, porous, and strong material with a high insulation value that is less expensive than traditional construction materials. Most importantly, lava rock is found in abundance throughout the United States.

Most wall structures in buildings are fabricated from either wood, steel, or aluminum studs. These studs are usually covered by siding or a stucco lath. In most climates, construction of these buildings require insulation to be placed in between the studs, increasing the cost of construction without adding to the structural integrity of the building. Likewise, the insulation and the construction materials themselves are inflammable. It is not uncommon that a building of this type has to be demolished if there is water intrusion due to flood or a hurricane.

Walls are also fabricated from some type of block structure, such as brick or cinder block that are held together by mortar. The construction of these walls necessitates the expertise of a mason to properly apply the mortar to the proper depth. The use of skilled brick masons increases the cost of construction of the buildings.

The construction of a typical block or brick structure also requires the transportation of the prefabricated blocks to the construction location. There they are unloaded and placed in a configuration to form the walls of the structure. The walls are built in a running bond pattern, with a layer of mortar between each tier of blocks. Skill in the art of masonry is required because mortar must be properly placed between each block and under each level row of blocks in an equal spacing pattern. Likewise, wall construction is a very time consuming. Cinder blocks used in construction are hollow to allow for the insertion of such necessities as electrical and plumbing and the voids provide additional reinforcement and reduction of their weight. However, these voids in the blocks take up a large volume, leading to inefficiencies in transportation. Also, there is usually waste, since the blocks are usually ordered as pallets.

The construction of walls with factory formed concrete panels produces relatively little waste, but has the drawback of being very heavy and difficult to transport to the job site. They also require the use of special equipment, such as a crane to construct the structure. While the "formed in place" concrete wall construction overcomes these issues, this method is more time consuming and generates waste. After the concrete dries, the form must be disassembled and removed from the site. In both instances, the concrete panels lack attractiveness, are difficult to finish, and have a tendency to develop cracks.

SUMMARY

The purpose of the abstract is not to define the invention, nor is it intended to limit the scope of the invention in any way. Its purpose is to inform, on a cursory inspection, the nature and essence of the invention.

The present invention discloses a way of building lightweight block walls in a stepwise process: fabricating the light weight lava block, setting the block and then filling the block with a lava and cement mixture or slurry.

The preferred embodiment of this invention discloses a mobile, lava block forming machine, but it is understood that the machine could be stationary and it could be very large with several molds, such as in a factor setting. The blocks could be manufactured at a large-scale facility and then transported to the building location.

A mobile lava block making machine is comprised of a mixing device, such as a motorized concrete utility mixer, wherein a properly proportioned mixture of ⅜ inch minus Lava material, ¾ inch Aggregate, Portland #2 Cement, Fly Ash (or a similar hardening catalyst), and fiber are dry mixed for at least five minutes to create a slurry mixture. Subsequently, clean water is added to the mixture. The wet mixture is mixed for an additional five minutes.

A preferred embodiment of the slurry mixture contains the following proportions of materials: (1) approximately 1230 lbs of ⅜ inch minus Lava material, (2) approximately 185 lbs of aggregate material, (3) approximately 550 pounds of Portland #2 cement, (4) approximately 2 pounds of fly ash per one yard (hardening catalyst), (5) approximately one pound fiber per cubic yard strength and (6) approximately 144 lbs of clean water.

Then, a measured amount of the slurry mixture is transported to a block mold wherein the material is set under high frequency vibration or pre-stressed. Once the slurry mixture is partially cured or set, the block will maintain its shape without the mold, and then the block is ejected from the mold and conveyed to a holding area for further curing.

In one embodiment the lava block is shaped similarly to that of a conventional cinder block with three interior void spaces formed by two interior and two exterior webs along with an open-ended exterior void space at the end of each block that is roughly half of the volume of each of the interior voids, so that the ends of the block has tabs or ears extending outwards from each side of the block. In addition, the top surface of the block has a shallow groove or channel down its centerline. The block predominantly consists of lava rock, thus it is called a "Lava block".

The lava blocks are then placed in a line to create the wall of a structure by dry stacking, which merely requires placing the blocks end to end to form a single tier or row. The process is repeated by placing the bottom surface of one block above and in direct contact with the top surface of the block beneath it, without the use of any mortar or binding agents. Plumbing, electrical, and rebar may be inserted into the hollow sections of the Lava Blocks forming the wall. The interior void spaces of the lava blocks are aligned in the vertical plane to form continuous vertical openings.

Once the wall is constructed to a certain level, the empty or hollow sections of all the blocks are filled with secondary lava and cement slurry mixture. The cement slurry mixture is less viscous than the slurry used to form the blocks, so that it flows relatively easily into all voids and hollow areas. The preferred embodiment of the secondary slurry mixture yields a compression strength of at least 1600 per square inch. The preferred embodiment also has superior insulation capabilities, for example, when one side is exposed to a temperature of approximately 114 F, the opposite side reaches a temperature of 68 F after approximately 80 hours.

DESCRIPTION OF THE DRAWINGS

Taking the following specifications in conjunction with the accompanying drawings will cause the invention to be better understood regarding these and other features and advantages. The specifications reference the annexed drawings wherein.

DETAILED DESCRIPTION

While describing the invention and its embodiments, various terms will be used for the sake of clarity. These terms are intended to not only include the recited embodiments, but are also meant to include all of their equivalents that perform substantially the same function, in substantially the same manner in order to achieve the same or similar result.

Herein disclosed is a method of building walls that eliminates these drawbacks in traditional wall construction methods. In the preferred method, a mobile lava block-making machine is transported to the job site, along with the ingredients to make the blocks. These ingredients include: crushed lava aggregate, a cementing agent, a hardening catalyst, and water. These ingredients are placed in certain proportions into the mobile lava block making machine. The machine mixes the materials together to form a slurry. The slurry mixture is formed into blocks. The blocks dry into a hardened form that can be used as building blocks. These lava rock building blocks are then dry stacked to form the walls of the structure. The blocks are placed into a wall formation as in a typical concrete or cinder block construction, but without the use of any mortar. Reinforcement metal rods or rebar may or may not be used, based upon the design criteria and height of the structure.

Once the wall is formed, the plumbing, electrical and HVAC requirements are installed inside the void areas of the blocks. Once these items are installed, the voids are filled with a slurry of lava rock and cement. This forms a solid wall that binds the blocks together via the channels in the top of each block as well as the voids in the center and ends of each block.

Because the blocks use a lightweight lava rock, as opposed to typical dense rock, the individual blocks are lighter in weight and easier to handle, making installation faster and easier. Dry setting the blocks without mortar further reduces the construction time and eliminates the need for an experienced mason. The raw materials for this type of construction can be placed in bags and boxes of any shape or size, making the materials easier to transport and saving on transportation costs. There is very little unusable waste material, if any, when this type of construction is completed. In addition, the end product is extremely fire retardant. Any unused lava rock can be used as fill on the jobsite for the garden, driveway or patio, for example. It can also be readily used on the next job.

Figure 1:
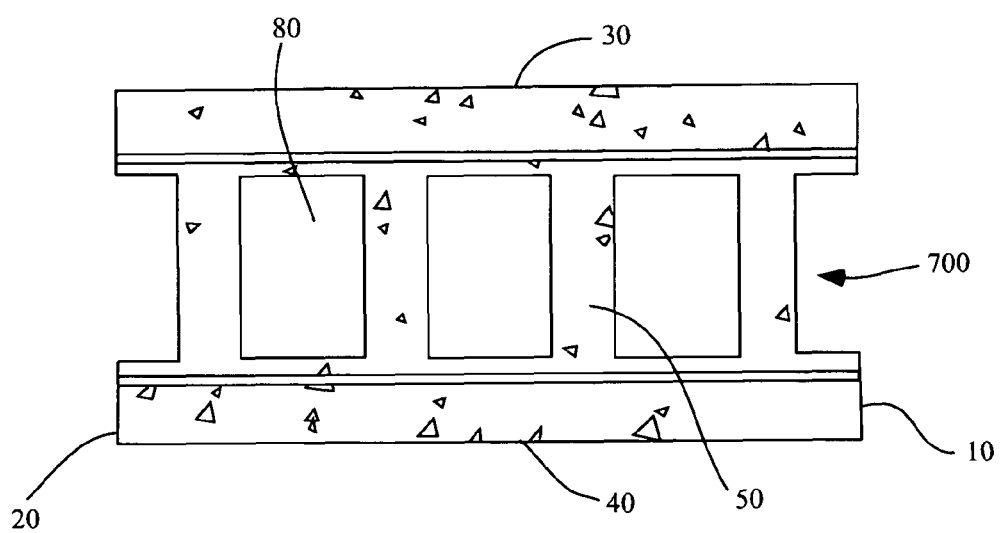
FIG. 1 is a top plan view of the Lava Block

A preferred embodiment discloses a Lava and Cement Building Block depicted in top plan view in FIG. 1 and indicted generally by the reference number 700 is comprised of a front wall 30, a rear wall 40, end walls 10, 20, the front and rear wall are joined by four webs 50. The webs 50 are spaced to form 3 void areas 80 whose boundaries are formed by the intersection of two webs 50 and the front wall 30 and the rear wall 40, forming a generally rectangular hollow in the block 700.

Each end wall 10, 20 is formed by the intersection of the front wall 30 and the rear wall 40 and a web 50 which is inset from the end points of the front wall 30 and rear wall 40, so that each end wall 10, 20 has a depressed area of half of volume of each void 80. So when the blocks are placed end to end in the construction of a wall the voids formed by two adjoining blocks is roughly equal to that of the center void 80.

Figure 2:
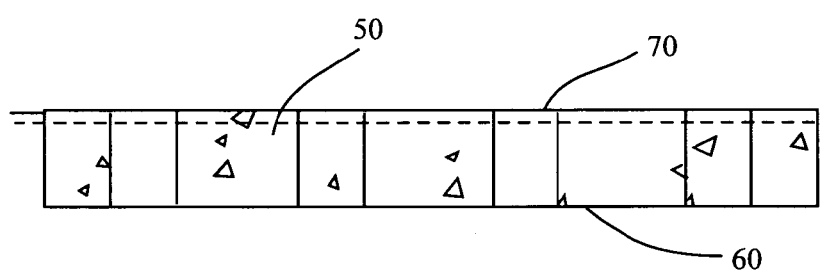
FIG. 2 is a side view of the Lava Block
Figure 3:
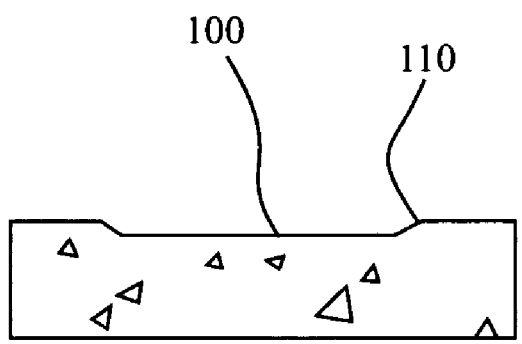
FIG. 3 is an end view of the Lava Block.

FIG. 2 depicts a side view of the building block with a flat bottom surface 60 and a top surface 70. The webs 50 extended upwards from the bottom surface 60 towards the top surface 70 with a height less than that of the front wall 30 and the rear wall 40 forming a shallow groove 100 as depicted in FIG. 3. The intersections between the front and rear wall 30, 40 and the webs 50 are transitioned with a beveled edge 110 that runs parallel to both the front wall 30 and the rear wall 40. The purpose for the beveled edge 110, the shallow groove 100, and the void 80 is to allow the slurry mixture to easily flow within a plurality of placed blocks 700 to form a solid wall and bind them all together.

Figure 4:
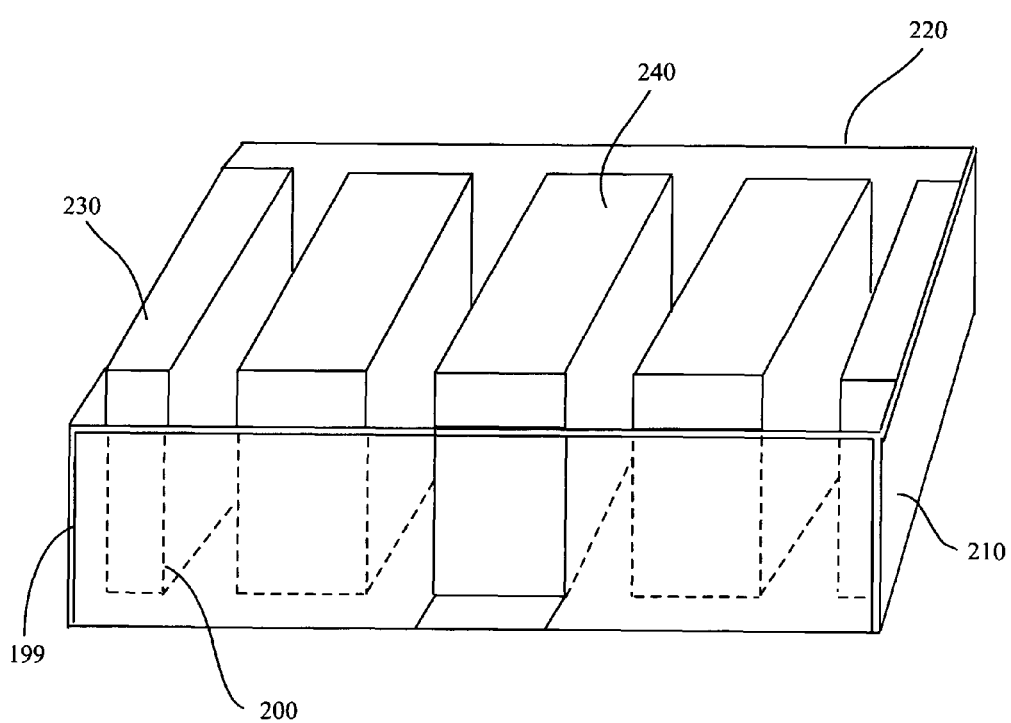
FIG. 4 is an isometric view of the Lava Block Mold.
Figure 5:
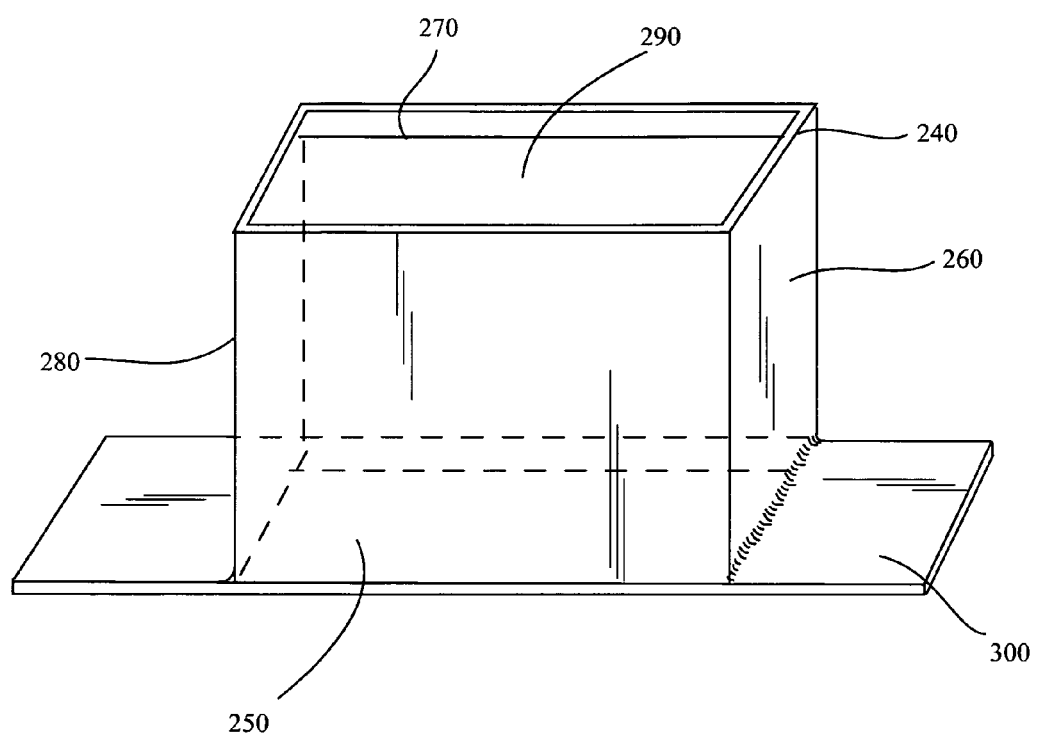
FIG. 5 is an isometric view of the Lava Block Mold Void.

FIG. 4 and FIG. 5 depict the components of the Lava Block Mold in a perspective view. The Lava Block Mold generally depicted by numeral 199 is comprised of a front wall 200, a back wall 220, and two end walls 210 and 230 arranged to form a box without a top or bottom. Inserted into this area outlined by the said four walls are a plurality of block voids depicted generally by the numeral 240 and comprise a six sided closed box with a front wall 250, a back wall 270, two end walls 260 and 280, a top wall 290 and an elongated bottom wall 300 which is approximately the same length as each end wall 210 and 230, so that when the voids 240 are inserted into the Lava Block Mold 199 the top portions of the bottom wall 300 is in direct contact with the bottom portion of the front 200 and back 220 walls of the lava block mold to allow for the assembly of the mold.

The block voids 240 can be dimensioned and located inside the Lava Block Mold 199 to form a myriad of different configurations, that is the web formed by the slurry being introduced can be varied by the placement, number and dimensions of the block voids 240. The height of the block voids 240, that is the length from the bottom wall 300 to the top wall 290 is less than the height of the Lava Block Mold 199, so that a channel may be formed on the Lava Blocks.

Figure 6:
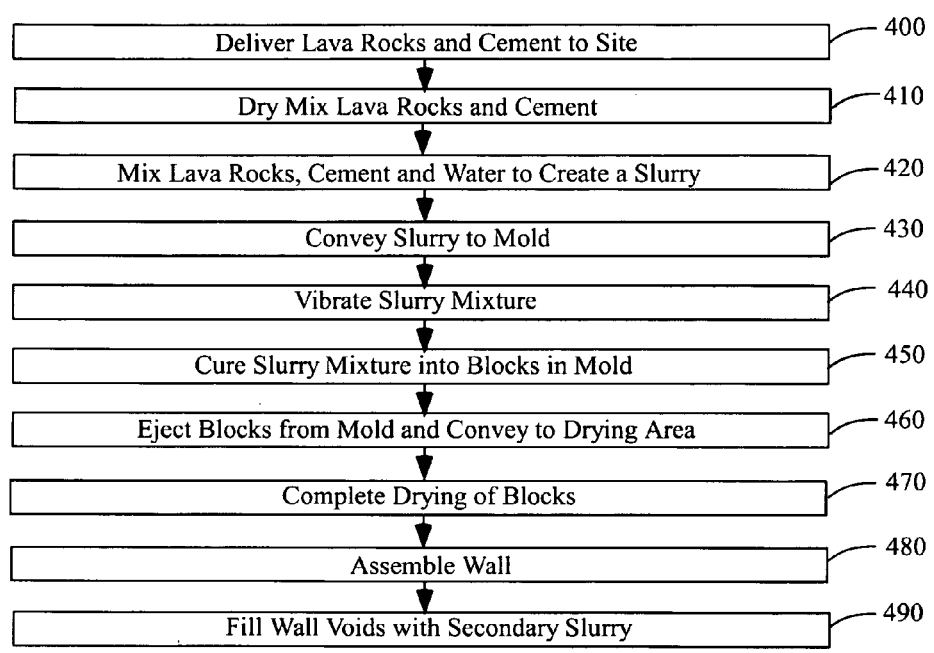
FIG. 6 is flow diagram illustrating the process of fabricating the Lava Block.

FIG. 6 depicts the process of fabricating the Lava and Cement Building Block System, wherein the process is repeated as many times as necessary to build the desired structure. In the first step 400, lava rocks and cement are delivered to the building site. In the next step 410, the lava rocks and cement are dry mixed to evenly distribute the two materials. Next, 420, the water is added to create the slurry mixture. In the next step, 430, the slurry poured into the mold, typically with a mechanized conveyor. Next 440, the slurry is vibrated in the mold for a period of six to eight seconds. Next 450, the mold, which contains the slurry mixture is moved to a curing area; curing being dependent on temperature and humidity, but usually taking only 24 hours. At the end of the curing process a block is solid block is produced. Next 460, the molds are removed from the blocks, and the blocks are dried further until use. In the next step 480, a wall is assembled by laying the block without mortar. Lastly 490, the wall is filled with the slurry to fill the voids between the blocks and to provide structural integrity.

Curing is typically accomplished by open air exposure to the sun. Curing may be accelerated by heating the conveyor to a temperature of 150 F.

Figure 7:
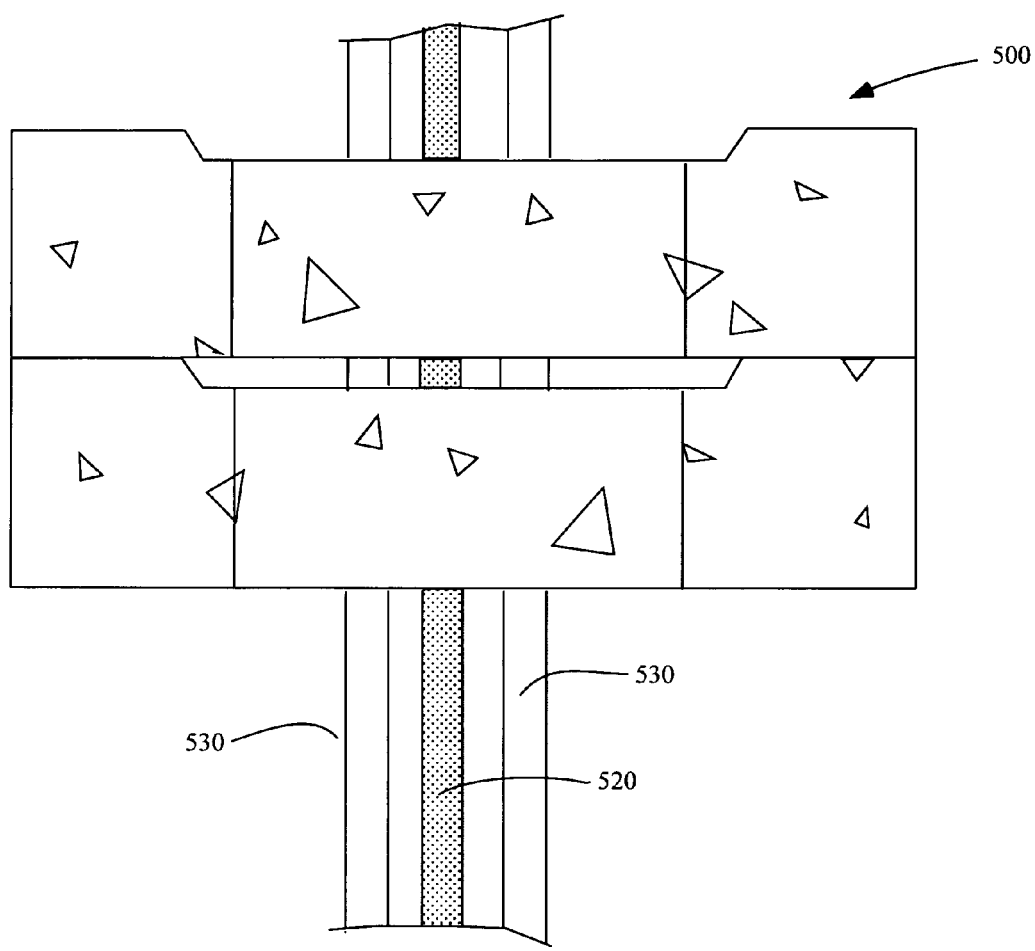
FIG. 7 is view of conduit, water, and rebar routed through the Lava Block.

Window and door openings are framed as is done with other block construction. Likewise, as is shown in FIG. 7, electrical PVC 510, rebar 520, and water pipes 530, may routed through the block 500.

Figure 8:
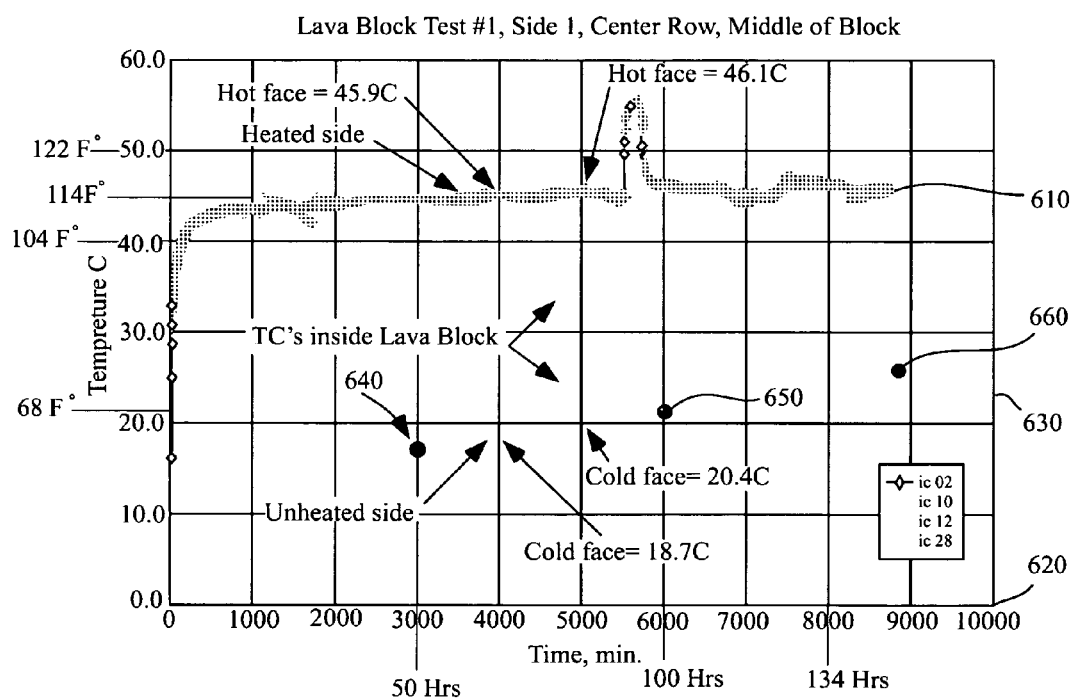
FIG. 8 is a temperature graph of the thermal characteristics of the Lava Block with heat applied to one side.

A graph of the Lava and Cement Block thermal characteristics are shown in FIG. 8. A temperature of 45.9 C is applied to the outside of the block. The upper temperature line 610 measures the temperature of the block versus the time axis 620. The lower temperature line 630 measures the block temperature on the opposite side of the block wall. As shown in FIG. 8, at 50 hours, the "hot face" has reached a steady state temperature of 45.9 C, the "cold face" has reached a temperature 640 of approximately 18 C. At 100 hours, the "cold face" has reached a temperature 650 of approximately 21 C. At approximately 150 hours, the "cold face" has reached a temperature 660 of approximately 25 C.

Figure 9:
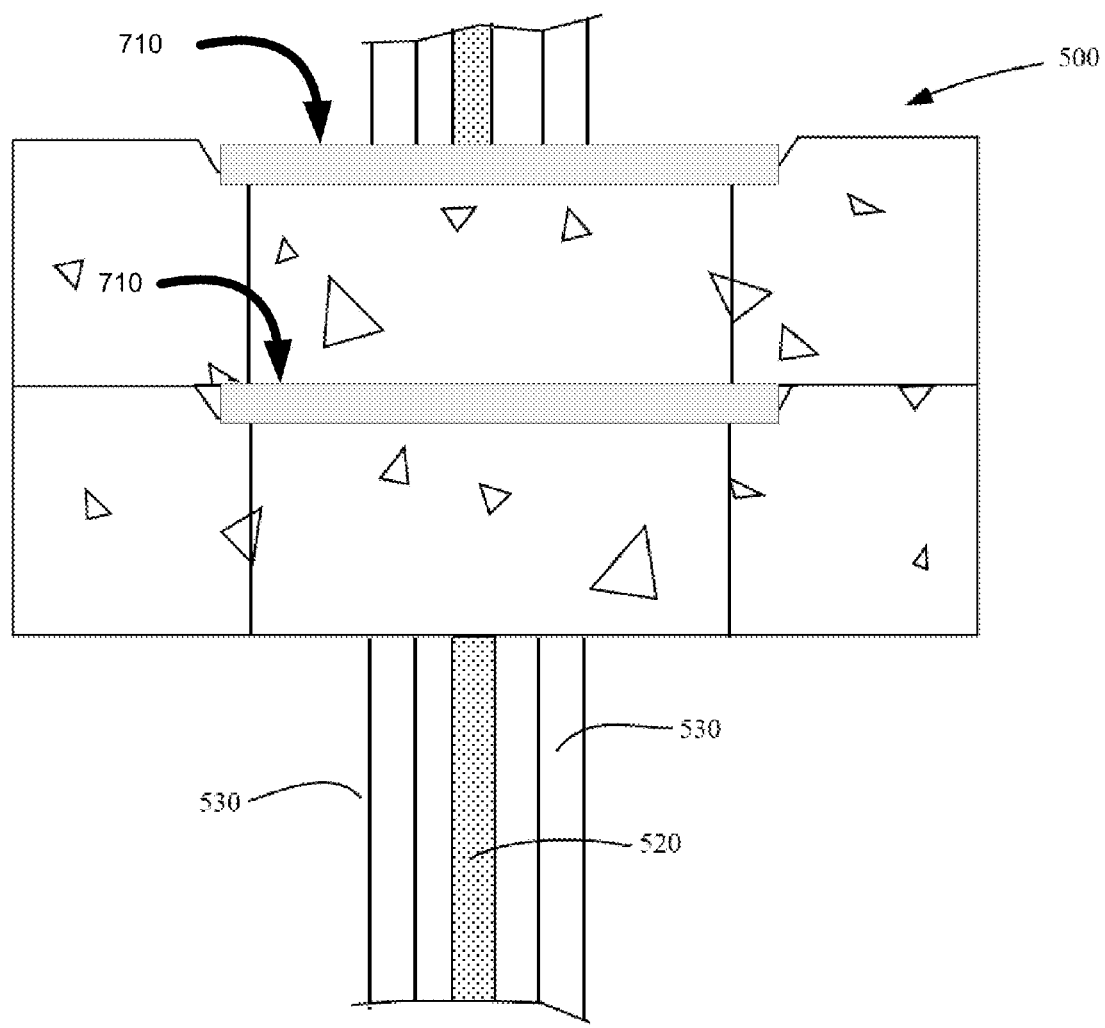
FIG. 9 depicts the void filled with a lava block material comprising lava rock; sand cement, a hardening catalyst and fiber.

As shown in FIG. 9, the void (not shown) is filled 710 with a lava block material. This lava block material is made of lava rock, sand cement, a hardening catalyst and fiber. This lava block material is introduced into the voids as a slurry of lava rock and cement.

The compression strength of the Lava and Cement Block system when constructed is estimated to be approximately 1600 lbs per square inch. This strength is based on the components being added in the approximate proportions as presented in the preferred embodiment. Variations in the mixtures will not significantly impact this strength.

The use of the Lava and Cement Block system has significant advantages. Lava is a readily available material throughout the Western United States and can be obtained close to the building site. The current use of wood frame building in the arid climates of the Western United States requires the transportation of wood building products to the building site from forests in the Eastern and Northern United States consumes natural resources. The construction of a building made from Lava Block in areas prone to flooding is advantageous in that a flooded building typically does not require demolition, unlike water damaged wood products.

Construction of a Lava and Cement Block building significantly reduces labor costs during assembly. Formed blocks are dry fitted without the use of mortar between the blocks, thus eliminating the need of a skilled mason. Similarly, the use of the Lava and Cement Block system requires less skill to construct walls as compared to wood frame construction.

The invention has been described in terms of the preferred embodiment. One skilled in the art will recognize that it would be possible to construct the elements of the present invention from a variety of means and to modify the placement of the components in a variety of ways. While the embodiments of the invention have been described in detail and shown in the accompanying drawings, it will be evident that various further modifications are possible without departing from the scope of the invention as set forth in the following claims.

The components of the slurry mixture for the preferred embodiment have been presented, but, it is recognized that acceptable blocks may be constructed when the ingredients are varied. For example the amount of lava rock may range from 1045.5 to 1414.5 lbs, the aggregate may range from 157.25 to 212.75 lbs aggregate; the Portland Cement may ranged from 440 to 825 lbs of Portland Cement; the hardening catalyst may be up to 10 lbs; the fiber may range up 20 lbs of fiber; and with the addition of 115.2 to 216 lbs of water. The variations of these components will vary the weight, compression strength, curing time, and thermal characteristics of the resultant block, but will still provide acceptable building characteristics.

The fiber may be either nylon fibers or straw or other materials with similar characteristics.

I claim:

1. A lava and cement building block system comprising:
    a lava block and lava slurry,
    the lava block comprising a flat bottom surface, a top surface, a front wall, a rear wall, two end walls, a first web and a second web,
    the first web positioned within the front wall and the rear wall to form a first void; and
    the first web and the second web positioned within the front wall and the rear wall to form a second void; and
    the second web position within the front wall and the rear wall to form a third void,
    such that the front wall, the read wall, the first web, the second web, are extending upwards from the bottom surface towards the top surface with a height that is less than that of the front wall;
    and the rear wall forms a shallow groove on the top surface transitioned with a beveled edge running parallel to both the front wall and the rear wall;
    and the two end walls are recessed relative the front and the rear wall; and
    wherein the lava block is consisting of lava rock; Portland Cement, a hardening catalyst, and fiber; and
    wherein the lava slurry is consisting of lava rock; Portland Cement, a hardening catalyst, and fiber;
    such that the lava slurry is inserted into the first void, the second void, and the third void,
    such that the first void, second void, and third void are filled with the lava slurry.

2. The lava and cement building block system as in claim 1 further comprising:
    wherein a first distance from the flat bottom surface to the top surface of the lava block is approximately 1";
    wherein a second distance to each end wall of the lava block is approximately 23×3¾" inches, and
    wherein a third distance from the front and rear walls of the lava block is approximately 11¾", and
    wherein a first outer dimension of said first void and second and third void are approximately 4"×6", and
    wherein a second distance from the top to the beveled edge of the lava block is approximately ¾", and
    wherein said distance between voids is approximately 2",
    and wherein said recessed areas proximate to said front and rear walls are approximately half the dimensions of said first void and second and third void.

3. The lava and cement building block system as in claim 1 further comprising:
    where the weight of the lava rock ranges from 1045.5 to 1414.4 lbs; and
    where the weight of the aggregate ranges from 157.25 to 212.75 lbs; and
    where the weight of the Portland Cement ranges from 440 to 825 lbs; and
    where the weight of the hardening catalyst ranges from 0 to 10 lbs; and
    where the weight of the fiber ranges from 0 to 20 lbs.

4. A lava slurry as in claim 1 further comprising:
where the weight of the lava rock ranges from 1045.5 to 1414.4 lbs; and
where the weight of the aggregate ranges from 157.25 to 212.75 lbs; and
where the weight of the Portland Cement ranges from 440 to 825 lbs; and
where the weight of the hardening catalyst ranges from 0 to 10 lbs; and
where the weight of the fiber ranges from 0 to 20 lbs.

* * * * *